2,750,257
METHOD OF MAKING ALUMINUM HALIDES

Clare Peter Johnson, Jr., Tompkins Corners, N. Y.

No Drawing. Application August 15, 1952,
Serial No. 304,657

7 Claims. (Cl. 23—93)

This invention relates to the production of aluminum halides and more particularly to a novel process for producing the chloride, bromide and iodide of aluminum. While the present process can be used to prepare any of the aluminum halides other than the fluoride, it is especially useful for the preparation of aluminum chloride and will be primarily described in connection with its use for this purpose.

For many years it has been known that aluminum chloride is a valuable catalyst for certain organic chemical reactions such as the Friedel-Crafts reaction, and in recent years considerable quantities of aluminum chloride have been used, particularly in the petroleum industry, for catalytic cracking and reforming processes. There has thus arisen a need for a relatively efficient and economical process of making aluminum chloride from cheap and readily available raw materials.

Numerous processes have previously been proposed for producing aluminum chloride, but so far as I am aware, all of these prior processes are open to such objections as the fact that they produce an impure product, or give uneconomically low yields, or use relatively expensive raw materials, or involve serious operating problems. Thus it has been suggested that aluminum chloride be made by heating mixtures of aluminum-bearing ores and various reagents to vaporize aluminum chloride which is recovered by condensation. However, such ores commonly contain silica which reacts to form volatile silicon halides that contaminate the product. It has also been suggested that aluminum chloride be made by reaction of aluminum oxide and carbonyl chloride, but carbonyl chloride is a relatively hazardous material to work with. The processes that utilize elemental aluminum are open to the objection that aluminum metal is an expensive raw material.

It is accordingly an object of the present invention to provide an improved process for making aluminum halides. It is another object of the invention to provide a simple process for making high purity aluminum chloride in good yield from inexpensive, readily available raw materials. Other objects of the invention will be in part obvious and in part pointed out hereafter.

In one of its broader aspects, the present invention comprises heating an intimate mixture of aluminum fluoride and an alkaline earth metal halide selected from the group consisting of calcium and magnesium chlorides, bromides and iodides to vaporize an aluminum halide from the mixture, and recovering the volatile aluminum halide in solid form by condensation. I have found, for example, that when the proper process conditions are established aluminum fluoride reacts with either calcium chloride or magnesium chloride or a mixture thereof to give a good yield of aluminum chloride in relatively pure form. The aluminum fluoride and alkaline earth metal chloride are preferably reacted in finely divided solid form to provide good contact between these reactants. However the reaction can also be carried out in a fused salt bath or other suitable reaction medium. The temperature at which the mixture is heated may be varied over a relatively wide range, but temperatures of 800° to 1000° C. are preferred. The reaction proceeds readily to produce aluminum chloride vapors that can be condensed in known manner and the resulting solid aluminum chloride is then recovered in relatively pure form.

In like manner calcium bromide and iodide and magnesium bromide and iodide can be mixed with aluminum fluoride and heated to produce aluminum bromide and aluminum iodide respectively.

In order to point out more fully the nature of the present invention, the following specific example is given of an illustrative embodiment of the present method:

A mixture of finely divided calcium chloride and anhydrous aluminum fluoride was prepared by mixing approximately equal amounts by volume of these two reactants. A quantity of the mixture as thus prepared was introduced into a platinum container which was in turn inserted in a quartz reaction tube. The reaction mixture was heated to a temperature of 800° to 1000° C. for a period of somewhat over an hour. A small amount of an aqueous acid distillate formed first, and thereafter vapors were formed which were condensed to form a yellow sublimate. This sublimate was analyzed and found to be anhydrous aluminum chloride.

It is of course to be understood that the foregoing example is illustrative only and that changes can be made in the reactants and reaction conditions without departing from the spirit of the invention as defined in the appended claims.

I claim:

1. A method of producing aluminum chloride which comprises heating a substantially anhydrous and silica-free mixture of aluminum fluoride and an alkaline earth metal chloride selected from the group consisting of calcium and magnesium chlorides at a temperature above the vaporizing temperature of aluminum chloride to vaporize aluminum chloride from said mixture.

2. A method of producing aluminum chloride which comprises heating a substantially anhydrous and silica-free mixture of aluminum fluoride and an alkaline earth metal chloride selected from the group consisting of calcium and magnesium chlorides at a temperature above the vaporizing temperature of aluminum chloride to vaporize aluminum chloride from said mixture, and condensing the resulting vapor to recover said aluminum chloride in solid form.

3. A method of producing aluminum chloride which comprises heating a substantially anhydrous and silica-free mixture of aluminum fluoride and calcium chloride at a temperature above the vaporizing temperature of aluminum chloride to vaporize aluminum chloride from said mixture, and condensing the resulting vapor to recover said aluminum chloride in solid form.

4. A method of producing aluminum chloride which comprises heating a substantially anhydrous and silica-free mixture of aluminum fluoride and magnesium chloride at a temperature above the vaporizing temperature of aluminum chloride to vaporize aluminum chloride therefrom, and condensing the aluminum chloride vapors to solid form to recover said aluminum chloride.

5. A method of producing aluminum chloride which comprises heating a substantially anhydrous and silica-free mixture of aluminum fluoride and an alkaline earth metal chloride selected from the group consisting of magnesium and calcium chlorides at a temperature of 800° to 1000° C. to vaporize aluminum chloride from said mixture, and condensing the resulting aluminum chloride vapors to recover aluminum chloride in solid form.

6. A method of producing a substantially fluorine-free aluminum halide which comprises heating a substantially anhydrous and silica-free mixture of aluminum fluoride and an alkaline earth metal halide selected from the group consisting of the chlorides, bromides and iodides of calcium and magnesium at a temperature above the vaporizing temperature of said fluorine-free halide to vaporize said fluorine-free halide from said mixture.

7. A method of producing a substantially fluorine-free aluminum halide which comprises heating a substantially anhydrous and silica-free mixture of aluminum fluoride and an alkaline earth metal halide selected from the group consisting of the chlorides, bromides and iodides of calcium and magnesium to a temperature of 800° to 1000° C. to vaporize said fluorine-free aluminum halide from said mixture, and condensing the resulting vapors to recover said fluorine-free aluminum halide in solid form.

References Cited in the file of this patent

UNITED STATES PATENTS

| | | |
|---|---|---|
| 1,392,044 | Booth | Sept. 27, 1921 |
| 1,566,269 | Burgess | Dec. 22, 1925 |
| 1,716,102 | Blumenberg | June 4, 1929 |
| 1,764,501 | Blumenberg | June 17, 1930 |
| 1,764,502 | Blumenberg | June 17, 1930 |
| 1,818,839 | Brindley | Aug. 11, 1931 |
| 2,258,412 | Kahl | Oct. 7, 1941 |

FOREIGN PATENTS

| | | |
|---|---|---|
| 2,267 | Great Britain | of 1871 |

OTHER REFERENCES

Mellor: "Comprehensive Treatise on Inorganic and Theoretical Chemistry," vol. 5, pages 300, 301, 312, 313; Longmans, Green and Co., N. Y., 1924.